(12) United States Patent
Schaumberger et al.

(10) Patent No.: US 7,654,061 B2
(45) Date of Patent: Feb. 2, 2010

(54) COMPOSITE PANE AND RETAINING STRUCTURE WITH AT LEAST ONE COMPOSITE PANE OF THIS TYPE

(75) Inventors: Franz Schaumberger, Aschach (AT); Franz Heger, Gundelfingen (DE); Markus Heimhuber, Dietersheim (DE)

(73) Assignees: Saint-Gobain Glass France, Courbevoie (FR); Josef Gartner GmbH, Gundelfingen (DE)

( * ) Notice: Subject to any disclaimer, the term of this patent is extended or adjusted under 35 U.S.C. 154(b) by 205 days.

(21) Appl. No.: 11/579,994

(22) PCT Filed: May 4, 2005

(86) PCT No.: PCT/EP2005/052050

§ 371 (c)(1),
(2), (4) Date: Jan. 31, 2007

(87) PCT Pub. No.: WO2005/108060

PCT Pub. Date: Nov. 17, 2005

(65) Prior Publication Data

US 2007/0227096 A1 Oct. 4, 2007

(30) Foreign Application Priority Data

May 10, 2004 (DE) .................... 10 2004 023 638
Jul. 23, 2004 (DE) .................... 20 2004 011 577 U

(51) Int. Cl.
*E04C 2/54* (2006.01)
*E06B 3/00* (2006.01)
*B44F 1/06* (2006.01)
*B32B 5/12* (2006.01)

(52) U.S. Cl. .................... 52/786.11; 52/208; 52/509; 428/38; 428/81; 428/99; 428/105; 428/111

(58) Field of Classification Search .............. 52/786.11, 52/208, 134, 136, 137, 509; 428/38, 81, 428/99, 105, 111
See application file for complete search history.

(56) References Cited

U.S. PATENT DOCUMENTS 361,622 A * 4/1887 Frasch .................... 423/423

(Continued)

FOREIGN PATENT DOCUMENTS

EP 0 320 674 6/1989

(Continued)

*Primary Examiner*—Richard E Chilcot, Jr.
*Assistant Examiner*—Mark R Wendell
(74) *Attorney, Agent, or Firm*—Oblon, Spivak, McClelland, Maier & Neustadt, L.L.P.

(57) ABSTRACT

A composite pane (3) having at least two rigid (glass) plates (3.1, 3.2) and an intermediate layer (33) has flexible holding elements (4) which are positioned in the plane of the intermediate layer between the two rigid plates and extend over their outer edge, for securing the composite pane to a substructure or holding structure (1). According to the invention, flat sections of the holding elements (4) are inserted into corner and/or edge regions of the composite pane (4) and are provided with perforations (4P), and high-strength thin filaments (4F), fibres or woven strands are guided in looped form through or around these perforations (4P), in order thereby to form load-bearing parts of the flexible holding elements (4) which project outward out of the composite.

24 Claims, 2 Drawing Sheets

U.S. PATENT DOCUMENTS

| | | | |
|---|---|---|---|
| 2,382,956 A | | 8/1945 | Boicey et al. |
| 2,659,686 A | | 11/1953 | Watkins |
| 3,261,739 A | * | 7/1966 | Porter .......................... 428/428 |
| 3,953,630 A | | 4/1976 | Roberts et al. |
| 4,204,374 A | * | 5/1980 | Olson ........................... 52/208 |
| 4,551,372 A | * | 11/1985 | Kunert ......................... 428/38 |
| 4,933,227 A | * | 6/1990 | Stewart ........................ 427/192 |
| 5,679,417 A | * | 10/1997 | Menegazzo .................. 428/14 |
| 6,818,281 B2 | * | 11/2004 | Blevins et al. ............... 428/194 |
| 7,257,927 B2 | * | 8/2007 | Sayer ......................... 52/171.1 |
| 2004/0040228 A1 | * | 3/2004 | Emde et al. ................. 52/173.3 |

FOREIGN PATENT DOCUMENTS

| | | |
|---|---|---|
| EP | 0 525 690 | 2/1993 |
| GB | 708242 | 5/1954 |

\* cited by examiner

COMPOSITE PANE AND RETAINING STRUCTURE WITH AT LEAST ONE COMPOSITE PANE OF THIS TYPE

The invention relates to a composite pane having the features of the preamble of claim 1 and to a holding structure having at least one such composite pane.

All-glass facades and structural elements made from glass are increasingly being used in architecture; for safety reasons, composite safety glass is used in most cases. The glass assemblies formed from composite safety glass in this case have to be suitably secured to a substructure, a foundation, to holding rails or sections, cables or the like, and in this context it is increasingly required that reliable securing of the pane be retained even in the event of the pane breaking.

EP 320 674 A2 describes a composite pane having the features of the preamble, which is secured to a structure with the aid of flexible holding elements which on one side are inserted into the composite intermediate layer and on the other side project at least beyond two opposite edges of the composite pane. These holding elements are also described as tabs and at least in part consist of a woven and/or braided and/or knitted fabric which can contain fibers of metal, glass or plastic. Two or more holding elements can be distributed at intervals along an edge. Whereas the composite panes themselves are connected to the substructure by being adhesively bonded to frames (also referred to as structural glazing), the holding elements are separately connected mechanically to the substructure independently of the adhesive bonding. This configuration greatly reduces the risk of pieces of glass dropping out of the plate structure even in the event of possible failure of the adhesive bonding.

DE 23 12 491 A1 describes windshields, in particular for aircraft, which are likewise particularly securely and reliably attached to the window frame at the edge by means of woven glass fibre mats inserted into the intermediate layer, so that the pane can be held in the frame even in the event of it breaking. However, in this relatively old design, the dimensions of the pane thicknesses and of the intermediate layers are so great that they cannot be used for standard applications. Moreover, according to this description this high-strength insert extends continuously over the entire periphery of the composite pane in question.

In the case of a composite glass pane which is known from DE 41 25 182 A1, inherently rigid holding elements are inserted into the intermediate thermoplastic film of a composite glass pane comprising at least two individual panes; the holding elements lead out of the composite glass pane at the end sides. The holding elements have plate-like regions made from flat material provided with apertures, by means of which regions they are inserted into the joining layer between two individual glass panes in edge regions of the composite glass pane. A plurality of holding elements of relatively short lengths can be arranged spaced apart from one another along an edge of the composite pane. The joining layer should penetrate into said apertures and, after it has cured, form a positively locking connection to the holding elements. However, the flow properties of the organic intermediate layers which are customarily used is not generally sufficient to fill the apertures. This not only reduces the strength of the glass element, but also allows bubbles to form. A variant is also mentioned in which only the section of the holding elements which is embedded in the composite assembly is in plate form, while the section which is intended to be connected to the substructure can also be shaped to form a securing element, e.g. in a hook shape or consisting of round material.

The product known as "Sentryglas® Plus" (Sentryglas is a registered trademark belonging to DuPont) is available as an intermediate layer film for composite glass which allows significantly stronger connections to be made than with the conventional PVB films, which are in very widespread use for standard composite glass panes. U.S. Pat. No. 6,559,230 B2 describes a heat-curable composition for producing a composite safety glass intermediate layer.

The invention is based on the object, starting from EP 320 674 A2, of providing a further improved composite pane having at least two rigid panes and an intermediate layer which connects these panes to one another by surface adhesion for high-strength and permanent anchoring in a wall or ceiling structure, and of describing a holding structure having at least one composite pane of this type.

According to the invention, this object is achieved by the features of claim 1 with regard to the composite pane and of the independent claim 15 with regard to the holding structure. The features of the subclaims respectively following the independent claims give advantageous refinements of this invention. The further independent claim 24 relates to building glazing having at least one composite pane and/or holding structure according to the invention.

In the context of the present invention, the terms plate, pane, individual pane are to be understood as meaning plate-like elements which preferably consist of glass, glass-ceramic or plastic and are preferably translucent or transparent. However, it is also possible to use opaque plate-like elements made from metal or another material which is not transparent. The various materials can also be used in combinations in the composite pane according to the invention. These composite panes may in turn form part of a (further) composite assembly in the form of a composite and/or insulating glass pane.

On account of the outer region of each holding element being connected to the inner flat section, embedded in the composite, of the holding elements by means of high-strength filaments, fibers or woven fabrics, in addition to the high strength of the filaments, fibers or woven fabrics themselves, a very high tear resistance is also achieved for the holding element as a whole.

The flexible section of each holding element which projects out of the composite can in principle be adhesively bonded or clamped directly to a holding structure or substructure or can be adhesively bonded or clamped to a fitting secured to the holding structure or substructure. Should this be impossible or undesirable, it is advantageously possible for securing means, such as drilled holes or eyelets, or holding bodies, such as welded-on nuts, profiled sections, pins, tubes or the like to be fitted thereon. Of course, it is also possible to provide angled-off securing regions. Overall, however, it is preferable to use solutions in which the holding elements are no thicker than the composite panes themselves, i.e. do not rise above the main surfaces thereof. However, this advantageous design can also be modified in favor of thicker holding bodies if required.

In the context of the present invention, an "outer" or "outwardly projecting" region of the holding element or elements is to be understood as meaning not only a region or section which protrudes beyond an outer edge or peripheral edge of the respective composite pane, but also a region or section which extends into a drilled hole in the composite pane. In this context, the peripheral edge of a drilled hole is also to be regarded as an edge of the composite pane.

According to the invention, in addition to composite panes with securing devices at the edge side (in frame form), it is thus also possible for glazing held in punctiform fashion to be equipped with securing-holding elements of the type described here.

Since associated holding bodies are flexibly attached to the holding elements outside the finished composite panes, there is only a very low risk of initial damage during transport, handling and assembly. Moreover, in the event of any damage, this flexible configuration allows the damaged composite pane to be, as it were, elastically attached to the holding structure or to a fitting connected to the holding structure. On account of the embedded intermediate layer, the composite pane retains its sheet structure and in any event still has a certain covering, insulating and/or damping action.

Samples of these holding elements have been produced, embedded in composite panes and then subjected to tensile tests. Extremely high tensile strengths were achieved. In all cases, failure occurred in the region of the filaments or woven strands. In no case was it possible for a holding element to be completely torn out of the composite. Ultimately, therefore, by suitably selecting a material for filaments or woven fabrics, it is possible to achieve a strength which is equal to the tearing forces or loads even of the rigid panes.

Suitable materials for the holding elements and holding bodies are metals (e.g. titanium, stainless steel), plastics, plastic-metal composites and the like. Good results have been achieved with holding elements whereof the flat sections embedded in the composite consisted of high-strength plastics reinforced with glass fibres or carbon fibres. Of course, a rough surface of the flat sections will improve the adhesion with respect to the adhesive intermediate layers still further. Kevlar was used for the filaments or woven strands, but there are also other alternatives which can be selected according to the particular loads encountered. Furthermore, the filaments or woven fabrics can also be spun, braided, can be in fiber form and can be processed.

In one embodiment, one or more of the panes of the composite glass pane according to the invention consist of toughened glass. Although it is not imperative for safety regions, since the individual panes are adhesively bonded to one another by an adhesive joining layer, the toughening increases the tensile and bending strength of the glass panes and also their ability to withstand fluctuating temperatures. It is known that glass can be chemically or thermally toughened; thermal toughening is less expensive for the relatively high thicknesses of the glasses used for glass structures. Even if toughened glass panes of this type disintegrate into a large number of small pieces when they break, these pieces are retained as a (resilient) body on account of the good adhesion to the intermediate layer, and this body still imparts a relatively high resistance in penetration tests. This is true in particular in a combination with a high-strength film or intermediate layer of the abovementioned product type produced by DuPont. However, it is also possible for all currently known materials to be used as the intermediate layer, including those which will be employed in future, provided that they are suitable for embedding holding elements of the type described here.

It is expedient for the panes to be joined to one another and to the holding element by means of a joining process which is known per se involving the application of heat and/or pressure. A thermoplastic adhesive film of polyvinylbutyral has proven a suitable organic joining layer. However, it is also possible to use other suitable adhesive joining layers, e.g. of the abovementioned high-strength type, since this achieves a particularly high adhesive strength and durability. In this case, the joining process must of course be adapted to the processing of these intermediate layers.

The adhesive joining layers for the rigid panes can also perform further tasks, for example sound insulation, filtering of the UV radiation from sunlight or coloring of the composite pane. Moreover, it is possible for one or more of the joining layers which join the individual panes and/or the holding element to be configured in the form of a laminate with an additional function. This laminate then comprises two joining layers, between which is placed a further plastic film, for example of polyethylene terephthalate. This plastic film may, for example, itself be colored or may be provided with an optically transparent thin film which reflects a specific spectrum of electromagnetic radiation, in particular infrared rays.

Further details and advantages of the subject matter of the invention will emerge from the drawing of an exemplary embodiment, without this having any restricting character, and the associated detailed description of the drawing which follows. In the drawing, in each case in simplified form and not to scale:

Figure 1:
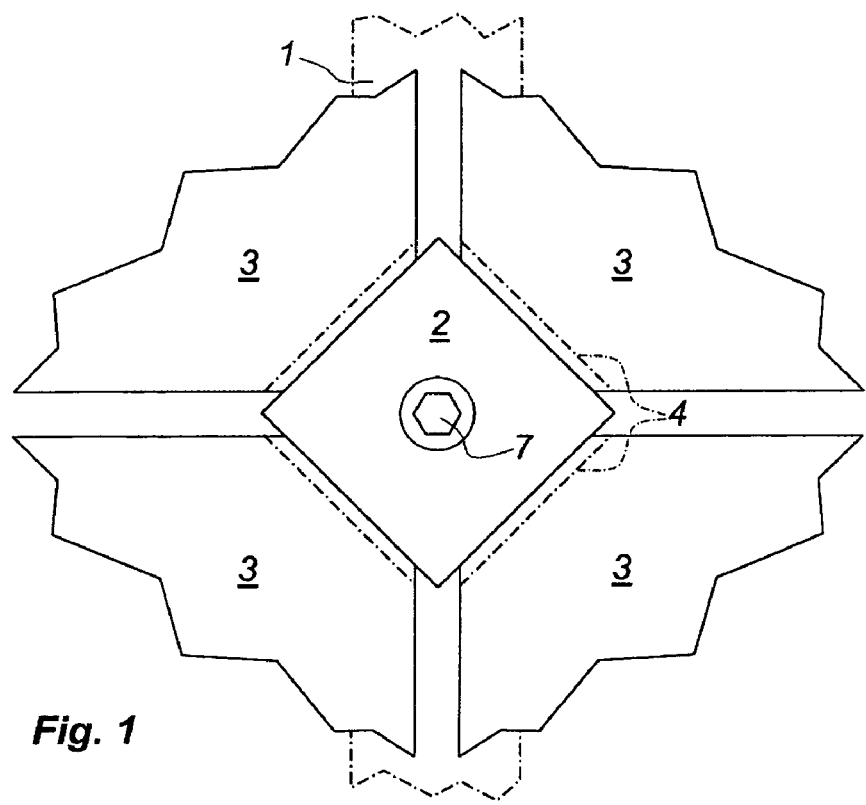
FIG. 1 shows a view of a clamping fitting in a plate structure, e.g. facade glazing, which fixes four corners of composite panes.

In accordance with FIG. 1, a holding structure 1, whereof the substructure is only schematically represented here by a vertical profiled beam, comprises at least one clamping fitting 2 which, depending on the static demands, can be connected to the holding structure as a fixed bearing or as a movable bearing. As an alternative to the profiled beam, it would also be possible to provide a cable tensioning system or similar suitable structural elements.

The clamping fitting 2 engages and covers the (in this case right-angled) corners of four composite panes 3, which are therefore fixed to the holding apparatus at these corners by the clamping fitting 2. The edges of holding elements 4 inserted into the composite panes 3 are indicated by dot-dashed lines; the structure and function of these holding elements can be seen more clearly in the sectional illustration presented in FIG. 2.

As an alternative to this illustration, the holding elements according to the invention which have been laminated or embedded in place could also be inserted in the longitudinal profile of one or more edges of the composite panes. In this case, suitable receiving measures will also be provided at the corresponding points of the substructure. By way of example, a configuration of this type, in which securing or holding elements are arranged in the edge profile of the composite panes, is suitable for glazing which in any case has the composite panes enclosed in a complete frame or at least frame sections. Of course, corner and edge securing means can also be combined with one another, depending on the particular design.

In a further variant, which differs from this illustration, one or more holding elements are inserted at or around a drilled hole in a composite pane, into which hole a clamping fitting (known as a punctiform holder) can then be inserted. In accordance with FIG. 1, with this punctiform holder variant, a purely visual change would result, whereby it is not the corners of four panes which are held by a fitting, but rather just a single pane 3, into the drilled hole in which the fitting 2 connected to the holding structure 1 has been inserted. Moreover, the known punctiform holder fittings are generally round when seen in plane view (cf. for example EP 655 543

B1, EP 201 212 B1). In this variant, an "outer" section of each holding element projects into the clear space in the drilled hole. Therefore, the correspondingly modified fitting or punctiform holder encloses not only the composite pane or the hole area, but also the holding element(s) to the extent that they project beyond the edge of the hole.

FIG. 2 once again illustrates the holding structure 1, which is only diagrammatically indicated and to which the clamping fitting 2 is releasably secured by bolts or the like indicated only by vertical dot-dashed lines. The clamping fitting 2 comprises a plurality of individual parts, namely a pedestal 5, a closure piece 6 and a central bolt 7, only the center axis of which is represented and the head of which can be seen in FIG. 1.

The pedestal 5 and the closure piece 6, between shoulders 5S and 6S, respectively, formed integrally thereon, form receiving compartments 8 for the corners of the composite panes 3. These corners are enclosed in the receiving compartments 8 between elastic plastic inlays 9. These can be designed as standard inlays made from any material suitable for direct contact with glass or plastic surfaces. However, they can also provide additional adhesive fixing of the composite panes in the clamping holders and also a certain sealing of the receiving compartments—and therefore of the space enclosed between the pedestal and the closure piece—with respect to the outside. Sealing and adhesion are achieved, for example, by the introduction of a suitable adhesive, permanently elastic compound, e.g. standard silicone, following the joining of the closure piece 6. This adhesive boost to the fixing of the composite panes 3 is, however, relatively slight compared to that produced by the holding elements which are laminated in place.

A section through the abovementioned punctiform holder variant would not look significantly different. In this embodiment, the pedestal 5 and the closure piece 6, between the shoulders 5S and 6S, respectively, integrally formed thereon, form an encircling receiving or clamping compartment 8 for the edge of said drilled hole in the pane 3. Of course, the invention can also be employed with punctiform holders which end flush with the surface (the outer surface in the installed position) of the composite pane and will simply be equipped with corresponding modifications (receiving spaces for the holding bodies).

The intermediate layer 3S of the composite panes between the two rigid panes 3.1 and 3.2 can be seen. In the region of the edges of the pane which lie in the receiving compartments 8, the holding elements 4, which comprise a flat section located in the intermediate layer and a holding body 4K fixedly connected to the flat section and located outside the composite, are embedded in this intermediate layer.

It will be understood that, in a modification to this illustration, the composite panes may also be composed of more than two rigid panes and more than one intermediate layer. Holding elements of the type explained here can then be embedded in just one intermediate layer or in a plurality of intermediate layers, if appropriate even in various planes.

The holding bodies 4K are each enclosed in a receiving space 11 which is formed by correspondingly shaped recesses between the pedestal 5 and the closure piece 6 and which is open toward the receiving compartments 8 via a narrow joint or a narrow gap 12. The flat section of the holding elements 4 can penetrate through this gap/joint without touching its walls, or if appropriate with just gentle contact. If necessary, however, it is also possible for a clamping action to be provided in this region.

Figure 2:
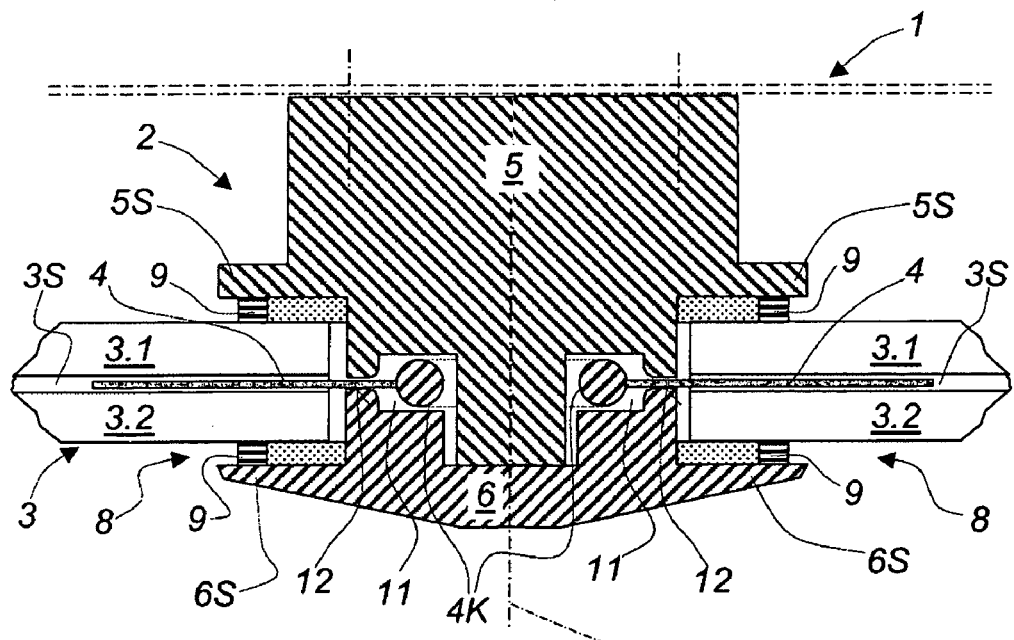
FIG. 2 shows a sectional view of the clamping fitting shown in FIG. 1 together with the opposite corners of two composite panes formed in accordance with the invention.

In the punctiform holder variant, it would on the one hand likewise be possible to provide a plurality of holding bodies 4K in the clear space in the drilled hole, or for these holding bodies to be combined to form a ring, for example. To indicate the latter variant, FIG. 2 shows dashed encircling lines at the holding body 4K.

However, it is not absolutely imperative that the receiving space be designed in chamber form with just one slot-like opening if this holding ring surrounds the central axis of the associated punctiform holder. It may then, for example, suffice for an encircling channel or groove to be provided in the punctiform holder; the holding ring can be placed into this channel or groove and then cannot be displaced or can only be displaced slightly in the axial direction after the punctiform holder has been installed, and in particular cannot be stripped off over the free end (remote from the holding structure) of the punctiform holder. Since the punctiform holder generally remains undamaged in the event of the composite pane breaking, the present invention therefore provides sufficient safety.

At the same time, the pedestal 5 and the closure piece 6 are matched to one another in such a way that they can be clamped securely together (generally at a stipulated torque) with the aid of the bolt 7, so that a defined residual height of the receiving compartments 8 is retained. This residual height enables safe and play-free securing of the composite panes to the holding structure to be ensured as a function of the thickness of the composite panes 3. Dimensional deviations and tolerances can be compensated for by the (selectable) thickness of the inlays 9, and to a small extent of course also directly by virtue of the elasticity of these inlays. This design avoids excessive forces being imposed, which could damage the intermediate layer and/or the rigid panes. At the same time, limited sliding and orientation of the composite panes is possible at least prior to final tightening of the bolt 7.

The holding body/bodies 4K is/are also not clamped in a mechanically positively locking manner in the receiving spaces 11; this therefore in particular avoids undesirable forcing and disruption to the predefined clamping forces between the pedestal 5 and the closure piece 6. As an alternative to this illustration, it is, of course, also possible for the holding bodies to be designed as hollow bodies or with cross sections differing from the round cross section shown here.

However, it is also conceivable for the receiving spaces 11 to be filled with a suitable curing or permanently elastic casting compound following the final fixing of the composite panes. In this case, it is possible that not all the receiving spaces 11 or not all the receiving compartments 8 will be filled with this compound, but rather just one fixed point will be provided (filled) for each composite pane, while degrees of freedom are left in the other clamping points in order to compensate for expansion and forces.

Figure 3:
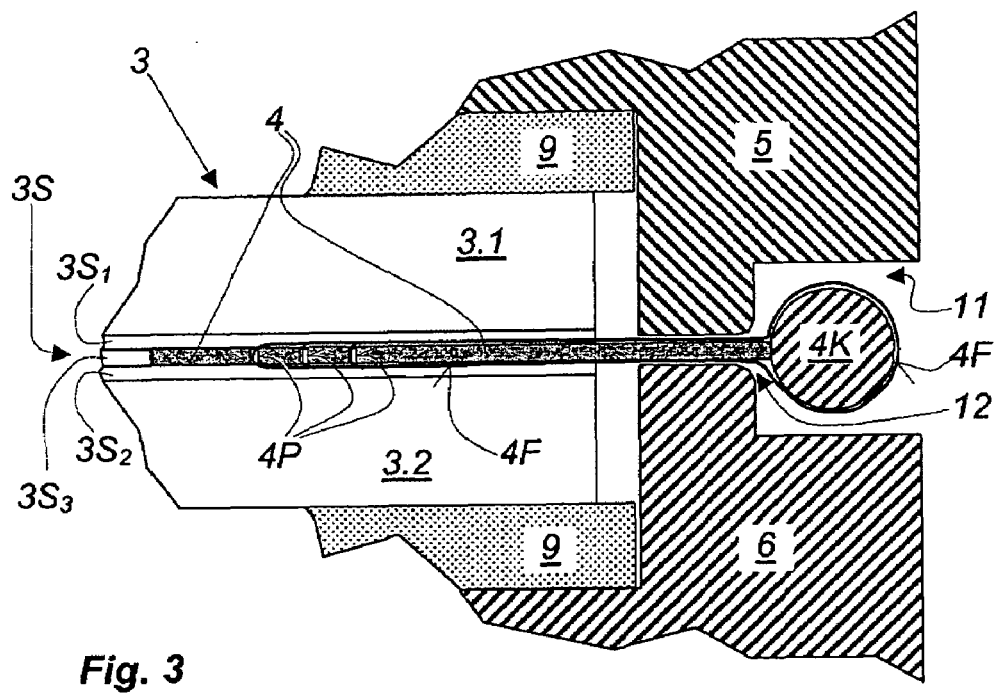
FIG. 3 shows an enlarged detail view from FIG. 2.

In the enlarged detailed view illustrated in FIG. 3, identical components are once again provided with the same reference designations as those used in FIG. 1 and 2. FIG. 3 once again shows that the intermediate layer 3S is at least originally—prior to final production of the adhesive composite—divided into three plies $3S_1$, $3S_2$, $3S_3$, with the latter ply being the middle one. This middle ply is cut back with respect to the two outer plies in the region where the holding element 4 is embedded, so that the flat section of the holding element 4 can be inserted into the gap. The three (preferably thermoplastic) plies fuse or flow together during the production of the composite, so that they themselves are no longer readily visible in the finished composite pane. In this figure, they are only shown in order to illustrate the excerpt.

Of course, it would in principle also be possible for the rigid panes 3 to be joined to one another by surface adhesion with the aid of a casting resin or the like and for the holding elements also to be embedded in the intermediate layer during this operation. However, this requires a certain additional outlay for positioning of the holding elements 4 at the corners (and/or at the edges) and as accurately as possible in the center of the intermediate layer plane. On the other hand, this would obviate the need to layer the three intermediate layer films on top of one another and cut them to size.

As a further operation for the production of a free space for the holding element to be embedded, it would also be possible for the rigid panes to be milled out at the surface in the receiving region in question (in each case on their surface which will subsequently be on the inner side in the composite), in which case half the thickness of the flat section of the holding element would be removed from each pane. When using plastic panes produced by injection-molding to produce the composite panes described here, it is, of course, also possible for recesses of this type to be produced in the injection mold.

In the case of this variant with recesses in the pane surfaces, not only is there no need to cut back any ply of the intermediate layer, but also it would be possible to completely dispense with the third (middle) ply $3S_3$ shown in FIG. 3.

The holding element 4 is also shown in more detail here. It can be seen that the flat section has a plurality of perforations 4P passing through it and that a number of filament strands 4F are passed through or around these perforations, then guided along both sides of the flat section and through the gap 12 into the receiving space 11, where they are finally wrapped around the holding body 4K.

The filament strands mentioned can be produced from a single, continuous filament or the like, which is then wound a number of times through perforations 4P and around the holding body 4K before having its two ends fixedly connected to one another (by being knotted, welded, clipped, etc.). However, it is also possible for each loop to be produced from individual filaments, or for the two options mentioned above to be combined (i.e. a plurality of filaments are used, but each of them passes through a plurality of perforations and is also wound around the holding body 4K a number of times)

The loops of filaments (or of fibers or woven strands) can be allowed to simply rest or bear loosely against the prefabricated holding element before the latter is installed in the composite pane, since after production of the composite they are in any case "bound" by the material of the intermediate layer.

As an alternative, it is possible for the loops and the flat section of the holding element, and if appropriate also the holding body 4K itself, to be sheathed or encapsulated with a permanently elastic casting compound, although this is not illustrated here. This casting compound will then be provided at least in the sections of the holding element which remains outside the finished composite pane. Within the composite, the loops are in any case already surrounded by the material of the intermediate layer.

It is clearly apparent from FIG. 2 and 3 that the holding bodies 4K are merely "blocked" in the receiving spaces 11, with the flat sections passed through the gaps 12 and the filaments 4F fixedly connecting them to the (clamped-in) composite panes. Should the composite pane break, the holding bodies 4K cannot escape from the receiving spaces 11, but merely come to bear against the inner edges of the gaps 12. This evidently secures the composite panes to the fittings 2 (irrespective of whether the latter are enclosing the panes at corners, edges or drilled holes), and this securing, as the abovementioned sample tests have demonstrated, can be subjected to very high mechanical loads. At the same time, this securing in no way impedes the abovementioned degrees of freedom at the fittings, which have to allow sliding movements between composite panes and substructure in order to compensate for differences in expansion or wind loads.

Figure 4A:
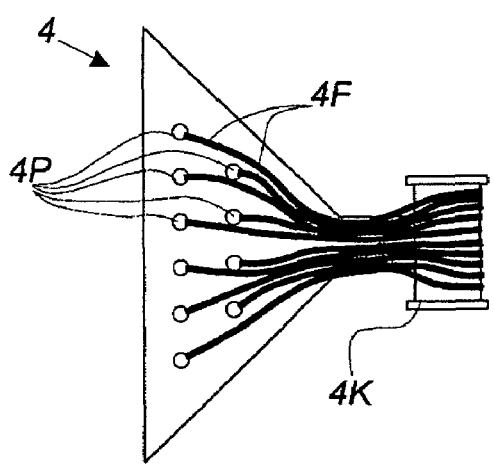
FIGS. 4a and 4b show two embodiments of holding elements for use in composite panes.

FIG. 4a diagrammatically illustrates a view of an individual holding element 4, with the perforations 4P, the filaments 4F and the body 4K with the filaments wrapped around it. The thickness of the filaments and of the flat section of the holding element 4 are to be matched to the thickness of the intermediate layer 3S or its plies in such a way that they can initially be fitted into the cut-out in the middle ply without particular effort and can subsequently be embedded in the outer layers when the latter are fused. During this embedding operation—which is accompanied by the external application of heat and/or pressure—irrespective of the adhesion between the adhesive composite intermediate layer plies $3S_1$, $3S_2$ and the flat section, a combination of nonpositive, cohesive and positive locking which can be subjected to very high mechanical loads is also achieved.

Figure 4B:
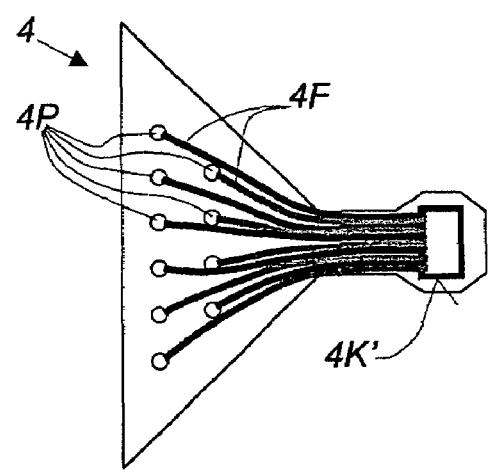

FIG. 4b shows another variant of the holding element shown in FIG. 4a, in which the holding body 4K of the embodiments explained above is replaced by a holding eyelet 4K'. Once again, the filaments 4F (which are illustrated in different colors here purely for the sake of clarity) have been pulled through perforations 4P in the flat section. Moreover, they are wound through the holding eyelet 4K'. The latter will be designed according to the loads which are to be absorbed and will have a very high tearing strength. In a modified form of the clamping fitting in accordance with FIG. 1 to 3, this holding eyelet 4K' is at least loosely fixed with the aid of a pin, shoulder or the like, with the pin in functional terms replacing the receiving space 11 and the gap 12. In principle, this variant can be used to achieve a flatter overall structure of the holding element outside the composite, although if high loads are expected (e.g. a high weight of the composite panes), the holding eyelet certainly cannot be made as flat as the flat section of the holding element.

For the punctiform holder variant which has already been mentioned a number of times, the holding element (or its flat section located within the composite) may furthermore be designed as a ring or part of a ring, which completely or partly surrounds the drilled hole in the composite pane. The holding body may in this case also expediently be designed as a ring which surrounds the central axis of the associated punctiform holder.

It should be noted that of course all the structural forms of the holding elements and their holding bodies can be combined at a composite pane. By way of example, with the aid of these measures (or with the aid of other equivalent variants, it is even possible to code the position of the composite panes, assisting with installation of these panes in the correct position on a substructure. Purely by way of example: a holding eyelet 4K' could be provided in each case at only one corner of the composite pane 3, while the other corners of the latter are designed with holding bodies 4K. In this case, the installation position of the pane can be unambiguously predetermined by corresponding design and arrangement of the fittings.

The invention claimed is:

1. A composite pane comprising:
   at least two rigid plates;
   an intermediate layer which connects said rigid plates to one another by surface adhesion;
   flexible holding elements positioned in a plane of the intermediate layer between the two rigid plates, and fixedly connected to the intermediate layer, the holding elements extending over at least one edge of the plates and being intended to secure the composite pane to a substructure or holding structure, wherein flat sections of the holding elements provided with perforations are inserted into or embedded in the intermediate layer; and high-strength thin filaments, fibres or woven strands looped through the perforations to form load-bearing parts of the flexible holding elements which project outward out of the composite.

2. The composite pane as claimed in claim 1, wherein the holding elements are embedded in the intermediate layer in corner regions of the composite pane.

3. The composite pane as claimed in claim 1-wherein the holding elements are embedded in the intermediate layer in edge regions of the composite pane.

4. The composite pane as claimed in claim 1, wherein at least one holding element is embedded in the intermediate layer in a region of a drilled hole passing through the composite pane and extends beyond an edge of the drilled hole into a clear space of the latter.

5. The composite pane as claimed in claim 1, wherein the intermediate layer is composed of three films, a middle one of these films being of approximately a same thickness as said flat sections of the holding elements and being provided with cut-outs for accommodating said flat sections, and wherein the two outer films are adhesively joined to the flat sections and to the filaments or woven strands passed through them.

6. The composite pane as claimed in claim 1, wherein the rigid plates of the composite pane are provided, on their inner surfaces in the composite, with shallow recesses creating the installation space for the holding elements.

7. The composite pane as claimed in claim 1, wherein the intermediate layer is produced by casting a curable compound and the holding elements are embedded therein.

8. The composite pane as claimed in claim 1, wherein the high-strength filaments or woven strands, outside the intermediate layer, are connected in looped fashion to three-dimensional holding means or are wrapped around these holding means, which holding means, in an installed state of the composite pane, can be connected to the substructure and are configured to securely hold the composite pane to the substructure at least in the event of the composite pane breaking.

9. The composite pane as claimed in claim 8, wherein the holding elements are prefabricated as units composed of flat elements, filaments, fibres or woven strands and holding means.

10. The composite pane as claimed in claim 8, wherein the holding means are designed as holding bodies with the filaments wrapped around them.

11. The composite pane as claimed in claim 8, wherein the holding means are designed as holding eyelets through which the filaments pass.

12. The composite pane as claimed in claim 8, wherein the filaments, fibres or woven strands and the holding element, at least in their sections arranged outside the composite, are surrounded by a permanently elastic casting compound.

13. The composite pane as claimed in claim 1, wherein the filaments, fibres or woven strands for each holding element are formed from one or more continuous strand/strands securely connected at two ends to form at least one closed loop.

14. The composite pane as claimed in claim 1, wherein at least one of the rigid plates of the composite pane is a toughened glass pane.

15. A holding structure for holding and securing at least one composite pane as claimed in claim 1, with the aid of fittings, which are assigned means for mechanically securing the flexible holding elements leading out of the composite panes, wherein each fitting has at least one receiving space and/or a pin for securing a three-dimensional holding means which is fixedly connected to a holding element.

16. The holding structure as claimed in claim 15, wherein a flat section of the holding element outside the composite pane is passed through a gap provided in the fitting.

17. The holding structure as claimed in claim 15, wherein fittings are designed as clamping fittings for clamping corners of the composite panes, each fitting comprising a pedestal and a closure piece, which between them form a gap and surround the receiving space or the pin, and also enclose the three-dimensional holding means between them.

18. The holding structure as claimed in claim 15, wherein fittings are designed as frames or frame sections for edges of the composite panes, each fitting comprising components which between them form a gap and surround the receiving space or the pin, and also enclose the three-dimensional holding means between them.

19. The holding structure as claimed in claim 15, wherein at least one fitting is designed to be inserted in a drilled hole in the composite pane, said fitting comprising components which between them form the receiving space or surround the pin, and also enclose the three-dimensional holding means at least in the axial direction of the drilled hole.

20. The holding structure as claimed in claim 15, wherein the holding elements are installed in their fittings free of any loads acting thereon.

21. The holding structure as claimed in claim 15, wherein the holding means of the holding elements are designed as holding bodies which, in an installed state, are arranged in the receiving space of the fittings.

22. The holding structure as claimed in claim 15, wherein the holding means of the holding elements are designed as holding eyelets, which, in an installed state, are arranged in the receiving space of the fittings and are secured therein with a pin of the fittings passing through them.

23. The holding structure as claimed in claim 15, wherein the holding elements, when installed, accommodated free of load but at least partially cast with a casting compound, in their fittings.

24. A building glazing, comprising composite panes as claimed in claim 1.

* * * * *